United States Patent [19]

Lotsch

[11] Patent Number: 4,719,300
[45] Date of Patent: Jan. 12, 1988

[54] ISOINDOLINE COLORANTS

[75] Inventor: Wolfgang Lotsch, Beindersheim, Fed. Rep. of Germany

[73] Assignee: BASF Aktiengesellschaft, Ludwigshafen, Fed. Rep. of Germany

[21] Appl. No.: 882,358

[22] Filed: Jul. 7, 1986

[30] Foreign Application Priority Data

Jul. 9, 1985 [DE] Fed. Rep. of Germany ....... 3524393

[51] Int. Cl.$^4$ ............................................. C07D 401/14
[52] U.S. Cl. ................................ 544/284; 106/288 Q; 106/308 N; 524/92
[58] Field of Search .......................................... 544/284

[56] References Cited

U.S. PATENT DOCUMENTS 4,500,718 2/1985 Rochat et al. ...................... 544/284
4,564,680 1/1986 Rolf et al. ............................ 544/284

FOREIGN PATENT DOCUMENTS 0029007 5/1981 European Pat. Off. .
2013230 8/1979 United Kingdom .

*Primary Examiner*—Glennon H. Hollrah
*Assistant Examiner*—James H. Turnipseed
*Attorney, Agent, or Firm*—Oblon, Fisher, Spivak, McClelland & Maier

[57] ABSTRACT

The novel colorants of the formula (I)

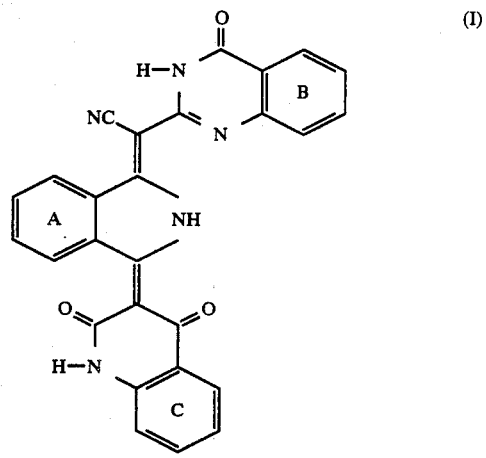

where the rings A, B and C independently of one another are unsubstituted or substituted by groups which impart insolubility, possess high color strength, very good fastness to migration and excellent lightfastness and weatherfastness and are therefore very useful for pigmenting plastics and surface coatings.

9 Claims, No Drawings

ISOINDOLINE COLORANTS

The present invention relates to isoindoline colorants. Reaction products of 1-[cyano-carbamylmethylene]-3-iminoisoindolines with 2,4-dihydroxyquinolines are disclosed in EP-A 29 007. They are reddish yellow colorants, but their lightfastness does not meet very high requirements. German Laid-Open Application No. DOS 2,757,982 discloses the condensate of 1-[cyano-quinazolonylmethylene]-3-iminoisoindoline with barbituric acid. This is a red pigment which has excellent ightfastness but little color strength.

It is an object of the present invention to provide isoindoline colorants which have improved color strength and/or improved lightfastness and weatherfastness compared with the prior art.

According to the present invention there are provided isoindoline colorants of the formula (I)

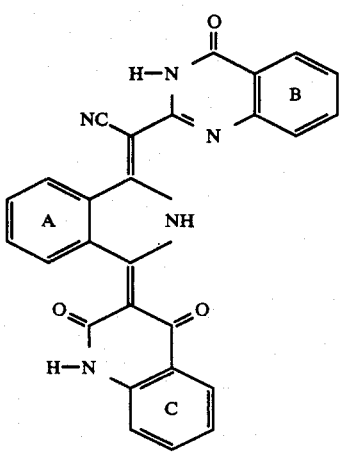

(I)

where the rings A, B and C independently of one another are unsubstituted or substituted by one or more groups which impart insolubility. The novel colorants possess high color strength, very good fastness to migration and excellent lightfastness and weatherfastness. The dyes are very useful for pigmenting plastics and in particular surface coatings.

Examples of substituents which impart insolubility are methyl, ethyl, methoxy, ethoxy, chlorine, bromine, nitro and trifluoromethyl, and any substituents in the rings A, B and C may be identical or different. Preferred substituents of the stated type are methyl, chlorine and bromine, and one or two of these substituents may be present.

Preferred colorants of the formula (I) are those in which the ring A is unsubstituted, in particular those in which the rings A and B are unsubstituted and ring C is unsubstituted or substituted by methyl or chlorine. Other preferred colorants of the formula (I) are those in which the rings A and C are unsubstituted and ring B is unsubstituted or substituted by chlorine or bromine.

The colorant of the formula (II)

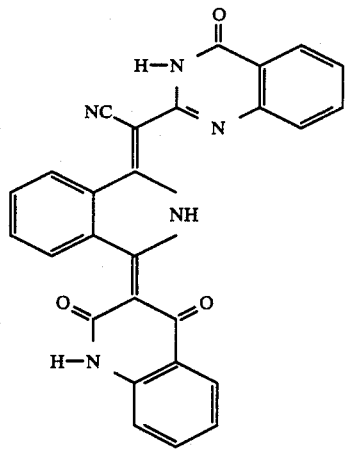

(II)

is very particularly preferred.

The colorants of the formula (I) can be obtained by a conventional process, by condensation of a 1-[cyanoquinazol-4'-on-2'-ylmethylene]-3-iminoisoindoline of the formula (III)

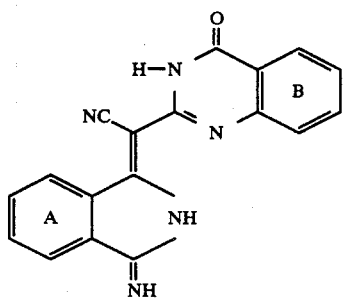

(III)

with a 2,4-dihydroxyquinoline of the formula (IV)

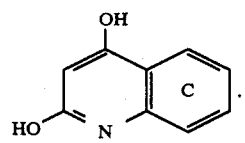

(IV)

In the formulae, A, B and C have the stated meanings. The colorants of the formula (I) are obtained, as a rule, in a pigmentary form and can be used directly for pigmenting surface coatings, printing inks and plastics.

However, the colorants (I) can also be converted to pigmentary forms optimum for their intended use, this suitably being done by a conventional conditioning method.

The Examples which follow illustrate the invention. Parts and percentages are by weight.

EXAMPLE 1

(a) 32 parts of 1-[cyano-quinazol-4'-on-2'-ylmethylene]-3-iminoisoindoline and 17 parts of 2,4-dihydroxyquinoline in 700 parts of propionic acid are kept for 12 hours at the boil. The mixture is cooled and then filtered, and the residue is washed with propionic acid and methanol and dried to give 42 parts of the colorant

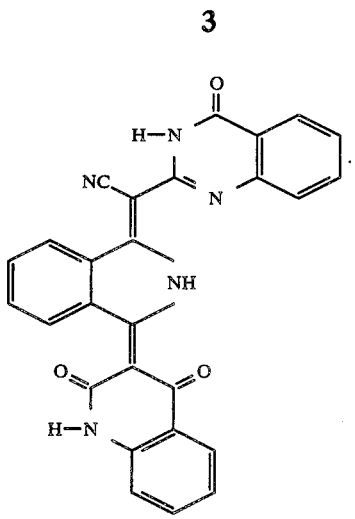

(II)

When incorporated into surface coatings, it gives yellowish red colorants possessing very good lightfastness and fastness to migration.

(b) 50 parts of the pigment from (a) are milled for 4 hours in a planetary ball mill containing 20 agate balls of 1 cm diameter and 20 agate balls of 2 cm diameter.

(c) The highly compacted, red finished mill base, which consists of agglomerates of primary particles of <0.1 μm, is stirred in 400 parts of dimethyl phthalate for 7 hours at 100° C. The mixture is cooled to 70° C., diluted with 100 parts of methanol and then filtered, and the residue is washed ester-free with methanol and dried.

When incorporated into surface coatings, the pigmentary form gives deep orange colorations possessing excellent weatherfastness.

(d) The procedure described under (c) is followed, except that o-xylene is used instead of dimethyl phthalate, and heating is carried out for 5 hours at 150° C. 49 parts of a pigmentary form are obtained. When incorporated into surface coatings, this product gives deep, bluish red colorations possessing excellent weatherfastness. The X-ray diffraction pattern of the bluish red pigmentary form differs from that of the orange pigmentary form obtained as described in (c) above. The diffraction pattern is reproduced in the Figure, and the lines are listed in Table 1.

EXAMPLES 2-14

The procedure described in Example (1a), (1b) and (1c) is followed, except that, instead of 1-[cyanoquinazol-4'-on-2'-ylmethylene]-3-iminoisoindoline and 2,4-dihydroxyquinoline, the compounds of the formulae III and IV which are listed below are used. The colorants obtained, when incorporated into surface coatings, give colorants in the stated hues and with similar properties.

| Example | III | IV | Hue |
|---|---|---|---|
| 2 | | | yellowish red |
| 3 | | | yellowish red |
| 4 | | | yellowish red |

-continued

| Example | III | IV | Hue |
|---|---|---|---|
| 5 | (structure) | 6-chloro-4-hydroxy-2-hydroxyquinoline | neutral red |
| 6 | (structure) | 7-chloro-4-hydroxy-2-hydroxyquinoline | neutral red |
| 7 | (structure) | 7,8-dichloro-4-hydroxy-2-hydroxyquinoline | yellowish red |
| 8 | (structure) | 6,7-dichloro-4-hydroxy-2-hydroxyquinoline | bluish red |
| 9 | (structure) | 7-bromo-4-hydroxy-2-hydroxyquinoline | neutral red |

-continued

| Example | III | IV | Hue |
|---------|-----|-----|-----|
| 10 | (5-chloro substituted structure) | 4-hydroxy-2-hydroxyquinoline | yellowish red |
| 11 | (5-bromo substituted structure) | 4-hydroxy-2-hydroxyquinoline | bluish red |
| 12 | (5-bromo, 3-chloro substituted structure) | 4-hydroxy-2-hydroxyquinoline | bluish red |
| 13 | (3,5-dichloro substituted structure) | 4-hydroxy-2-hydroxyquinoline | bluish red |
| 14 | (4-nitro substituted structure) | 4-hydroxy-2-hydroxyquinoline | yellowish red |

TABLE 1

| Lines in X-ray diffraction pattern | |
|---|---|
| Angle of diffraction $2\theta$ (CuK$^\alpha$ radiation) | Intensity [%] (relative to the strongest line) |
| 5.9 | 12 |
| 8.2 | 100 |
| 9.4 | 5 |
| 14.4 | 25 |
| 17.7 | 15 |
| 20.2 | 14 |
| 21.9 | 10 |
| 24.6 | 40 |
| 26.6 | 63 |
| 27.9 | 15 |
| 29.2 | 19 |

I claim:

1. An isoindoline colorant of the formula

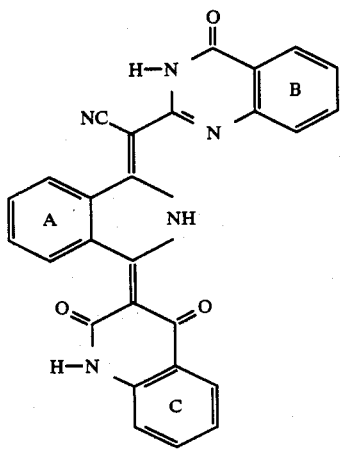

wherein the rings A, B and C are unsubstituted or, independently of one another are monosubstituted or disubstituted by a member selected from the group consisting of methyl, ethyl, methoxy, ethoxy, chloro, bromo, nitro and trifluoromethyl groups.

2. An isoindoline colorant as claimed in claim 1, wherein the rings A, B and C are unsubstituted or, independently of one another, are monosubstituted or disbustituted by methyl, bromine or chlorine.

3. An isoindoline colorant as claimed in claim 1, wherein the ring A is unsubstituted.

4. An isoindoline colorant of the formula

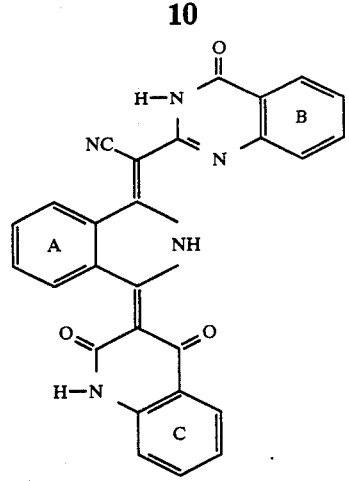

wherein the rings A and B are unsubstituted and the ring C is unsubstituted or monosubstituted or disubstituted by chlorine or methyl.

5. An isoindoline colorant as claimed in claim 4, wherein the rings A and C are unsubstituted and the ring B is unsubstituted or monosubstituted or disubstituted by chlorine or bromine.

6. The isoindoline colorant of the formula

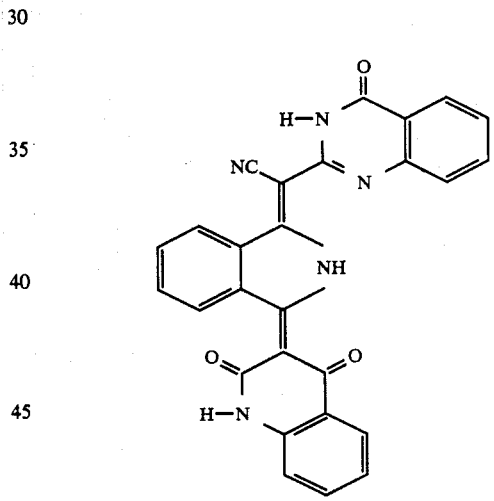

7. The isoindoline colorant as claimed in claim 6, which possesses an X-ray diffraction pattern which exhibits, at an angle of diffraction $2\theta$, lines of strong intensity at 8.2, 26.6 and 24.6, lines of medium intensity at 14.4, 29.2, 17.7, 27.9 and 20.2, and lines of weak intensity at 5.9, 21.9 and 9.4.

wherein the rings A, B and C are unsubstituted or, independently of one another are monosubstituted or disubstituted by a member selected from the group consisting of methyl, ethyl, methoxy, ethoxy, chloro, bromo, nitro and trifluoromethyl groups [substituted by groups which impart insolubility].—

Please cancel Claims 2 and 5 without prejudice.
Please add the following new claims:

8. An isoindoline colorant of the formula

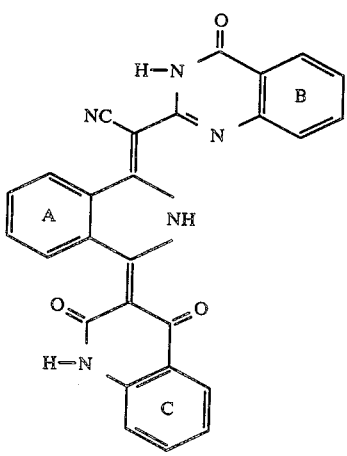

wherein ring A is unsubstituted and rings B and C are unsubstituted or, independently of one another, are monosubstituted or disubstituted by a member selected from the group consisting of methyl, ethyl, methoxy, ethoxy, chloro, bromo, nitro and trifluoromethyl groups.

9. The isoindoline colorant of claim 8, wherein rings B and C are unsubstituted or, independently of one another, are monosubstituted or disubstituted by a member selected from the group consisting of methyl, bromo and chloro groups.

* * * * *